United States Patent
Nakao

(10) Patent No.: US 9,842,284 B2
(45) Date of Patent: Dec. 12, 2017

(54) IMAGE PROCESSING APPARATUS AND METHOD, AND PROGRAM

(71) Applicant: Sony Corporation, Minato-ku (JP)

(72) Inventor: Yuta Nakao, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 99 days.

(21) Appl. No.: 14/459,724

(22) Filed: Aug. 14, 2014

(65) Prior Publication Data

US 2015/0093032 A1    Apr. 2, 2015

(30) Foreign Application Priority Data

Sep. 27, 2013  (JP) ................................. 2013-202438

(51) Int. Cl.
| | |
|---|---|
| G06K 9/46 | (2006.01) |
| G06K 9/50 | (2006.01) |
| G06K 9/62 | (2006.01) |
| H04N 5/232 | (2006.01) |

(52) U.S. Cl.
CPC ....... G06K 9/6293 (2013.01); H04N 5/23219 (2013.01)

(58) Field of Classification Search
None
See application file for complete search history.

(56) References Cited

U.S. PATENT DOCUMENTS

| | | | | |
|---|---|---|---|---|
| 6,445,819 | B1* | 9/2002 | Kinjo ................. | G06K 9/00228 358/453 |
| 2011/0249891 | A1* | 10/2011 | Li ...................... | G06K 9/00281 382/165 |
| 2013/0064425 | A1* | 3/2013 | Sagawa .............. | G06K 9/00221 382/103 |
| 2013/0215319 | A1* | 8/2013 | Tomita ..................... | G02B 7/28 348/345 |
| 2013/0259310 | A1* | 10/2013 | Tsukamoto ........ | G06K 9/00362 382/103 |
| 2013/0272570 | A1* | 10/2013 | Sheng ..................... | G06F 3/017 382/103 |

FOREIGN PATENT DOCUMENTS

JP    2013-120949    6/2013

* cited by examiner

*Primary Examiner* — David F Dunphy
(74) *Attorney, Agent, or Firm* — Oblon, McClelland, Maier & Neustadt, L.L.P.

(57) ABSTRACT

An image processing apparatus includes a subject area detector and a subject area determinator. The subject area detector is configured to perform subject detection processing to detect a subject area from an input image. The subject area determinator is configured to determine a final subject area by majority decision processing that is based on the subject areas detected in the subject detection processing performed a plurality of times.

24 Claims, 8 Drawing Sheets

IMAGE PROCESSING APPARATUS AND METHOD, AND PROGRAM

CROSS REFERENCE TO RELATED APPLICATIONS

This application claims the benefit of Japanese Priority Patent Application JP 2013-202438 filed Sep. 27, 2013, the entire contents of which are incorporated herein by reference.

BACKGROUND

The present disclosure relates to an image processing apparatus and method, and a program, and more particularly, to an image processing apparatus and method, and a program that are capable of detecting a subject with a higher accuracy.

Cameras in recent years achieve functions of recognizing a main subject for a photographer by various recognition techniques and supporting various types of photographing with the subject at the center. For example, such photographing supports include focus control, brightness adjustment, and color adjustment.

Further, as a technique of detecting a subject from a captured image, the following technique is also proposed: a subject is detected from a plurality of frames, and using the degree of stable presence as a result of the detection, a main subject on the image is determined (see, for example, Japanese Patent Application Laid-open No. 2013-120949).

SUMMARY

Incidentally, in the photographing support functions described above, a correct detection of an area of the subject directly leads to the improvement in performance.

In the techniques described above, however, it is difficult to correctly extract the area of the subject in various situations. This difficulty limits automatic functions and the range of expression of display user interfaces that lead to an increase in an added value. For that reason, it is desirable to improve detection accuracy for the subject.

The present disclosure has been made in view of such circumstances and it is possible to detect a subject with a higher accuracy.

According to an embodiment of the present disclosure, there is provided an image processing apparatus including a subject detection unit (subject area detector) and a subject area determination unit (determinator). The subject detection unit is configured to perform subject detection processing to detect a subject area from an input image. The subject area determination unit is configured to determine a final subject area by majority decision processing that is based on the subject areas detected in the subject detection processing performed a plurality of times.

The subject area determination unit may include an overlap determination unit and a majority decision unit (processor). The overlap determination unit is configured to calculate an overlap degree between two of the subject areas, for each of the subject areas detected in the subject detection processing performed the plurality of times. The majority decision unit is configured to determine the final subject area by the majority decision processing based on the overlap degrees.

The overlap determination unit may be configured to determine whether the subject areas overlap or not based on the overlap degrees, and the majority decision unit may be configured to perform the majority decision processing based on the number of overlaps between the subject area obtained by one of the subject detection processing and the subject area obtained by another one of the subject detection processing, the number of overlaps being obtained by a determination of the overlap determination unit.

The majority decision unit may be configured to determine the subject area having the largest number of overlaps as the final subject area.

The majority decision unit may be configured to exclude the subject area having a low degree of reliability based on the number of overlaps and calculate the final subject area based on the subject area that is left without being excluded.

The subject detection processing performed the plurality of times may include the same subject detection processing that is performed on input images with different resolutions.

The subject detection processing performed the plurality of times may include different types of subject detection processing that are performed on the same input image.

The image processing apparatus may further include a degree-of-reliability determination unit configured to determine, in a case where the final subject area is not obtained by the majority decision processing, the final subject area from the subject areas based on degrees of reliability of the subject areas detected in the subject detection processing performed the plurality of times.

According to another embodiment of the present disclosure, there is provided an image processing method or a program, including: performing subject detection processing to detect a subject area from an input image; and determining a final subject area by majority decision processing that is based on the subject areas detected in the subject detection processing performed a plurality of times.

According to an embodiment of the present disclosure, subject detection processing is performed to detect a subject area from an input image, and a final subject area is determined by majority decision processing that is based on the subject areas detected in the subject detection processing performed a plurality of times.

According to an embodiment of the present disclosure, a subject can be detected with a higher accuracy.

It should be noted that the effects described above are not necessarily restrictive and may be any effects described in this disclosure.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

Configuration Example of Imaging Apparatus

The general outline of the present disclosure will be described first.

In the present disclosure, subject detection processing of detecting a subject from an image is performed a plurality of times on an image as a subject detection target. For example, as the subject detection processing performed a plurality of times, the same subject detection processing is performed on a plurality of images with different resolutions.

Here, since the same subject detection processing is performed on the images with different resolutions, normally, the results of the subject detection are expected to be the same in all of the images with different resolutions. However, actually, depending on the subject and surrounding situations of the subject, a false detection may be caused in images with predetermined resolutions. In general, it is difficult to determine whether one subject detection result is correct or not.

In this regard, in the present disclosure, the same subject detection processing is performed for each resolution, and a wrong detection result or a false detection is detected and removed by a majority decision on the detection results. Thus, the subject can be detected with a higher accuracy than in the normal subject detection processing.

Figure 1:
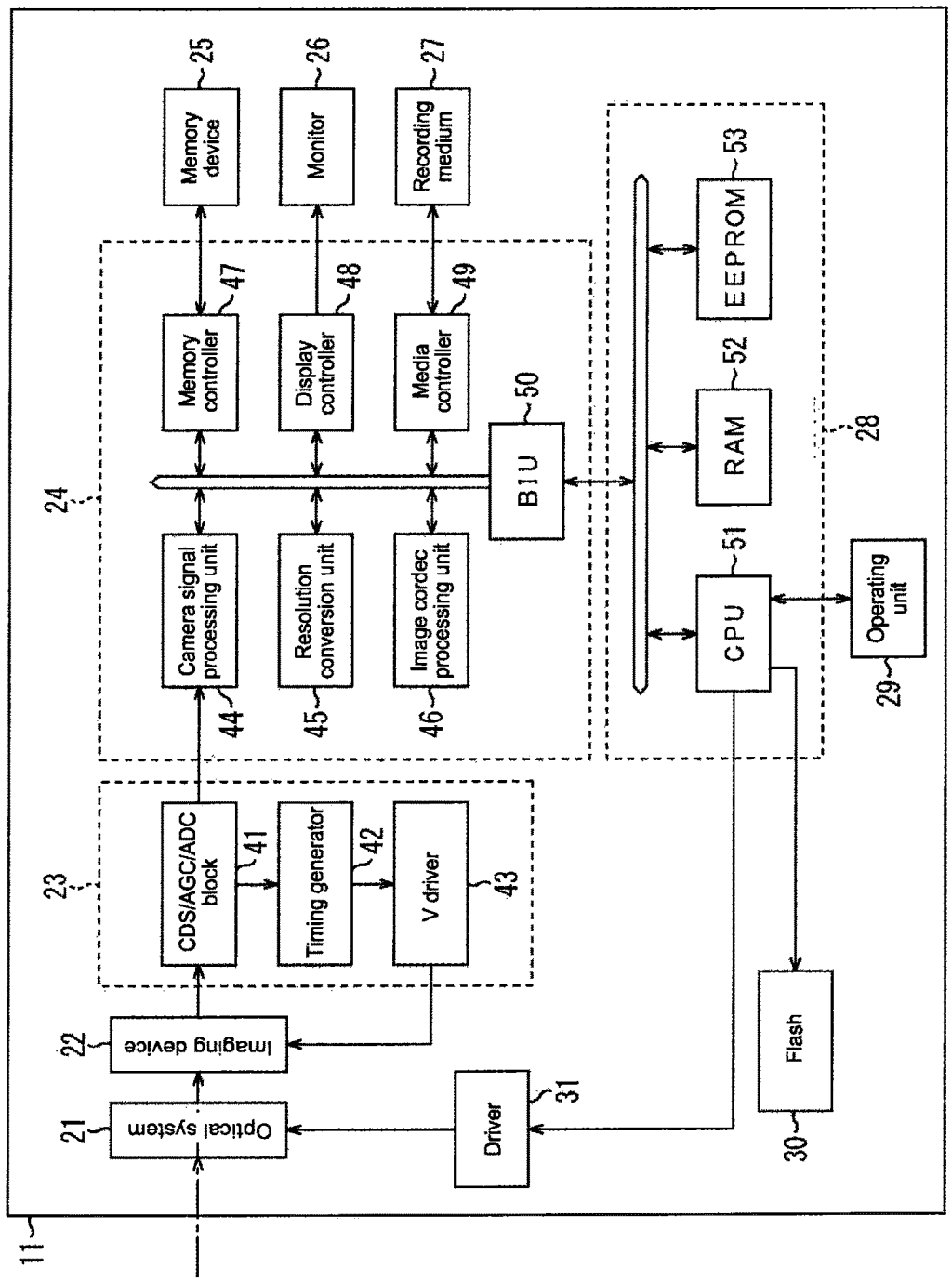
FIG. 1 is a diagram showing a configuration example of an imaging apparatus.

Next, a specific embodiment according to the present disclosure will be described. FIG. 1 is a diagram showing a configuration example of an imaging apparatus according to the embodiment of the present disclosure. For example, the imaging apparatus is constituted of a digital still camera, a digital video camera, or the like.

An imaging apparatus 11 shown in FIG. 1 includes an optical system 21, an imaging device 22, an AFE (Analog Front End) unit 23, a camera DSP (Digital Signal Processor) unit 24, a memory device 25, a monitor 26, a recording medium 27, a controller 28, an operating unit 29, a flash 30, and a driver 31. In the imaging apparatus 11, an image input via the optical system 21 is digitally processed and recorded.

The optical system 21 includes a lens for collecting light coming from a subject onto an imaging surface of the imaging device 22, a drive mechanism for moving the lens to perform focusing and zooming, a shutter mechanism for inputting the light from the subject to the imaging device 22 by an open and close operation in a predetermined period of time, an iris (aperture) mechanism for limiting a direction and a range of the beam of light from the subject, and the like.

The driver 31 controls the drive of each mechanism in the optical system 21 based on a control signal from the controller 28. For example, the driver 31 controls focusing to the subject and the drive of the iris.

The imaging device 22 is constituted of a solid-state imaging device such as a CCD (Charge Coupled Device) or a CMOS (Complementary Metal Oxide Semiconductor). The imaging device 22 receives the light coming from the subject via the optical system 21 to perform photoelectric conversion, and supplies the resultant electrical signal to the AFE unit 23.

The AFE unit 23 includes a CDS/AGC/ADC block 41, a timing generator 42, and a V driver 43. For example, the AFE unit 23 is constituted as one IC (Integrated Circuit) chip.

The CDS/AGC/ADC block 41 performs processing such as correlated double sampling, sample-and-hold processing, automatic gain control, and AD (Analog/Digital) conversion on the electrical signal supplied from the imaging device 22, and outputs the resultant digital image signal. The digital image signal thus obtained is image data of a captured image, which is captured by the imaging apparatus 11.

The timing generator 42 generates a timing pulse signal for driving the imaging device 22. According to the timing pulse signal, the V driver 43 outputs a drive signal for outputting charge of each pixel of the imaging device 22 in a vertical direction on a line-by-line basis.

The camera DSP unit 24 includes a camera signal processing unit 44, a resolution conversion unit 45, an image cordec processing unit 46, a memory controller 47, a display controller 48, a media controller 49, and a bus interface unit (BIU) 50.

The camera signal processing unit 44 performs preprocessing such as defective pixel correction, digital clamping, and digital gain control on the image data supplied from the AFE unit 23 and subsequently performs white balance adjustment, brightness adjustment, and contrast adjustment.

The resolution conversion unit 45 changes the size of the image depending on, for example, whether the captured image is output and displayed as a through image on the monitor 26 or stored as a moving image or still image in the recording medium 27.

The image cordec processing unit 46 performs compression coding processing on the image data of the captured image by a predetermined encoding method. The memory controller 47 writes data of the captured image and the like in the memory device 25 used as a frame buffer and controls an access operation for reading the data from the memory device 25.

The media controller 49 writes and reads the data in and from the recording medium 27. Specifically, the media controller 49 records and reproduces moving image data or still image data.

The monitor 26 is constituted of, for example, a liquid crystal panel. The display controller 48 controls the drive of the monitor 26 to convert the image data (through image) output from the camera signal processing unit 44 or the image data stored in the memory device 25 into a signal for being displayed on the monitor 26, and outputs the signal to the monitor 26.

The camera DSP unit 24 is connected to the controller 28 via the BIU 50. The controller 28 is constituted of a CPU (Central Processing Unit) 51, a RAM (Random Access Memory) 52 as a main memory, and an EEPROM (Electrically Erasable and Programmable ROM (Read Only Memory)) 53 that stores various types of information in a non-volatile manner.

The CPU 51 collectively controls the operation of the whole imaging apparatus 11 according to a user operation. For example, the CPU 51 controls the flash 30 to emit light to apply the light to the subject and controls the driver 31 to perform focus control.

Additionally, the CPU 51 is connected to the operating unit 29 that has an operation function for a user to input instructions, an output function such as a speaker and an LED (Light Emitting Diode) lamp, and the like.

(Configuration Example of Camera Signal Processing Unit)

Further, the camera signal processing unit 44 detects a subject from a captured image obtained by photographing to perform processing of outputting the detection results. A functional configuration of the camera signal processing unit 44 that performs such subject detection is shown in FIG. 2, for example.

Figure 2:
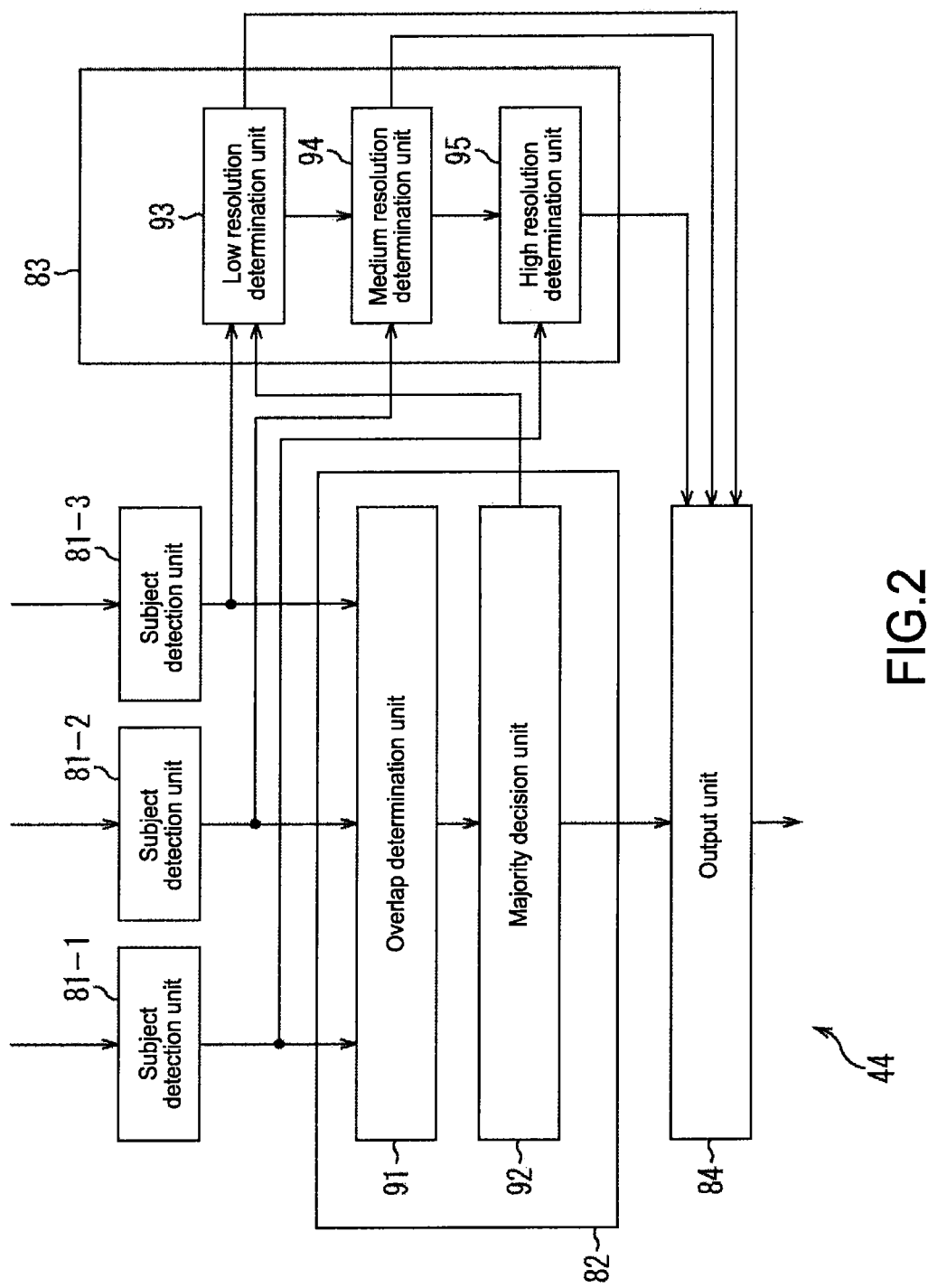
FIG. 2 is a diagram showing a configuration example of a camera signal processing unit.

FIG. 2 is a diagram showing a functional configuration of the camera signal processing unit 44. In FIG. 2, the camera signal processing unit 44 includes subject detection units 81-1, 81-2, and 81-3, a subject area determination unit 82, a degree-of-reliability determination unit 83, and an output unit 84.

Captured images with different resolutions or sizes are supplied as input images to the subject detection units 81-1 to 81-3.

For example, a captured image acquired from the AFE unit 23 by photographing (hereinafter, also referred to as high resolution image) is supplied to the subject detection unit 81-1. Further, an image that is acquired when the resolution conversion unit 45 performs resolution conversion on the captured image and has a resolution lower than that of the high resolution image serving as the original captured image (hereinafter, also referred to as medium resolution image) is supplied to the subject detection unit 81-2.

Further, an image that is acquired when the resolution conversion unit 45 performs resolution conversion on the captured image and has a resolution lower than that of the medium resolution image (hereinafter, referred to as low resolution image) is supplied to the subject detection unit 81-3.

The subject detection units 81-1 to 81-3 perform the subject detection processing on the supplied high resolution image, medium resolution image, and low resolution image to detect the subject from those images and supplies the detection results to the subject area determination unit 82 and the degree-of-reliability determination unit 83.

It should be noted that when the subject detection units 81-1 to 81-3 have not to be distinguished particularly in the following description, each of the subject detection units 81-1 to 81-3 is simply referred to as a subject detection unit 81. Here, in each subject detection unit 81, the subject detection is performed by the same algorithm. In other words, in the subject detection units 81, the resolutions of the images to be processed are different, but the same subject detection processing is performed on those images.

The subject area determination unit 82 determines a final subject area on the captured image by majority decision processing, based on the results of the subject detection on the images with the respective resolutions, the results being supplied from the subject detection units 81. Subsequently, the subject area determination unit 82 supplies the final subject area to the output unit 84. It should be noted that an area of the subject on the image is hereinafter referred to also as a subject area.

The subject area determination unit 82 includes an overlap determination unit 91 and a majority decision unit 92.

The overlap determination unit 91 performs overlap determination processing based on the results of the subject detection, which are supplied from the subject detection units 81.

For example, the overlap determination unit 91 calculates, for two optional images among the images with respective resolutions, the degree of overlap in subject areas detected from the two optional images, the degree of overlap being referred to as an overlap degree. The overlap determination unit 91 performs overlap determination processing of determining whether the subject areas on the two images overlap or not. The overlap determination unit 91 performs the overlap determination processing on all of sets that can be a combination of two images with different resolutions, and supplies results of the determination and the results of the subject detection performed on the images with respective resolutions to the majority decision unit 92.

When there are N images with different resolutions, the overlap determination processing is performed $_NC_2$ times. Here, the images with three different resolutions, that is, the high resolution image, the medium resolution image, and the low resolution image are processed, and thus N=3 and the overlap determination processing is performed $_3C_2$ times, that is, three times.

The majority decision unit 92 performs a majority decision based on results of the overlap determination, which are supplied from the overlap determination unit 91, and the results of the subject detection, and calculates a final subject area to be supplied to the output unit 84. Further, when the final subject area is not obtained by the majority decision, the majority decision unit 92 instructs the degree-of-reliability determination unit 83 to execute processing of determining a subject area based on the degree of reliability of the subject detection.

According to an instruction of the majority decision unit 92, the degree-of-reliability determination unit 83 determines a final subject area based on the degree of reliability on the results of the subject detection in the subject detection units 81 and supplies the results of the determination to the output unit 84. The degree-of-reliability determination unit 83 includes a low resolution determination unit 93, a medium resolution determination unit 94, and a high resolution determination unit 95.

According to the instruction of the majority decision unit 92, based on the result of the subject detection from the low resolution image, the result being supplied from the subject detection unit 81-3, the low resolution determination unit 93 determines the degree of reliability on the result of the detection. In the case where the result of the subject detection in the low resolution image is sufficiently reliable, that is, a sufficiently large degree of reliability is obtained as a result of the determination on the degree of reliability, the low resolution determination unit 93 supplies the result of the subject detection in the low resolution image to the output unit 84 as a final subject area. Further, in the case where the result of the subject detection in the low resolution image is not sufficiently reliable as a result of the determination on the degree of reliability, the low resolution determination unit 93 instructs the medium resolution determination unit 94 to determinate the degree of reliability.

According to an instruction of the low resolution determination unit 93, the medium resolution determination unit 94 determines the degree of reliability based on the result of the subject detection from the medium resolution image, the result being supplied from the subject detection unit 81-2. In the case where the result is sufficiently reliable, the medium resolution determination unit 94 supplies the result of the subject detection in the medium resolution image to the output unit 84 as a final subject area. Further, in the case where the result of the subject detection in the medium resolution image is not sufficiently reliable as a result of the determination on the degree of reliability, the medium resolution determination unit 94 instructs the high resolution determination unit 95 to determine the degree of reliability.

According to an instruction of the medium resolution determination unit 94, the high resolution determination unit 95 determine the degree of reliability based on the result of the subject detection from the high resolution image, the result being supplied from the subject detection unit 81-1. In the case where the result is sufficiently reliable, the high resolution determination unit 95 supplies the result of the subject detection in the high resolution image to the output unit 84 as a final subject area. Further, in the case where the result of the subject detection in the high resolution image is not sufficiently reliable as a result of the determination on the degree of reliability, the high resolution determination unit 95 supplies information, which indicates that a subject is not detected from the captured image at a sufficient degree of reliability, to the output unit 84.

The output unit 84 outputs the information indicating the subject area, which is supplied from the majority decision unit 92 or the degree-of-reliability determination unit 83, as subject information indicating a final subject area.

(Description on Subject Information Output Processing)

Subsequently, the operation of the imaging apparatus 11 will be described.

For example, when a user instructs the imaging apparatus 11 to photograph the subject, the imaging apparatus 11 captures an image of the subject to obtain a captured image. Specifically, the optical system 21 collects light coming from the subject to be input to the imaging device 22, the imaging device 22 receives the light input via the optical system 21 to perform photoelectric conversion and supplies a signal thus obtained to the CDS/AGC/ADC block 41.

The CDS/AGC/ADC block 41 performs processing such as correlated double sampling on the signal supplied from the imaging device 22 and then converts the signal, which has been subjected to various types of processing, into image data as a digital signal, to supply the image data to the camera signal processing unit 44. Further, the camera signal processing unit 44 appropriately performs preprocessing on the image data of the captured image supplied from the CDS/AGC/ADC block 41 and then supplies the captured image to the subject detection unit 81-1 and to the resolution conversion unit 45.

Figure 3:
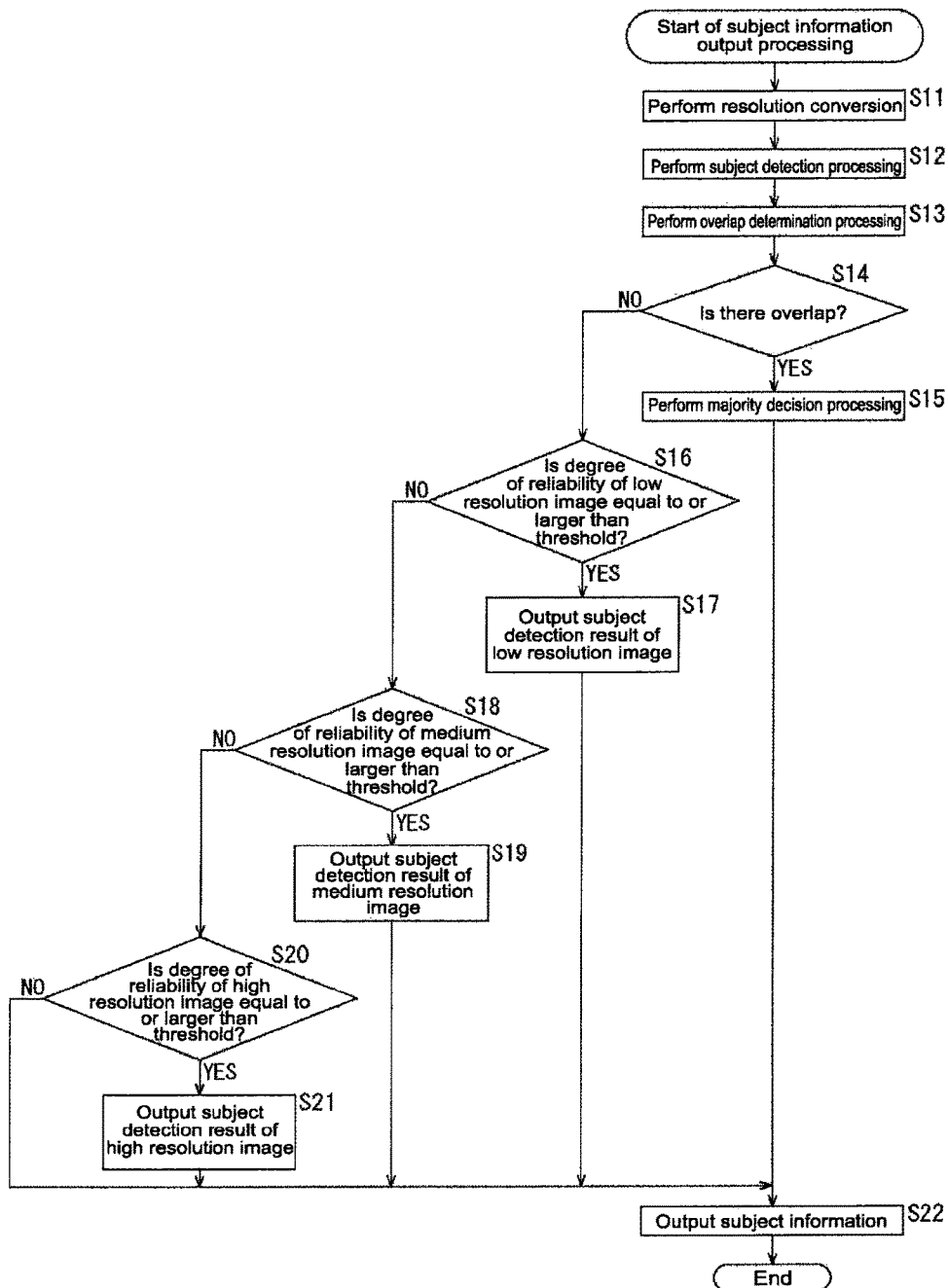
FIG. 3 is a flowchart for describing subject information output processing.

After the captured image is obtained in such a manner, the imaging apparatus 11 detects a subject area from the captured image and starts subject information output processing of outputting subject information. The subject information indicates a result of the detection. Hereinafter, the subject information output processing by the imaging apparatus 11 will be described with reference to a flowchart of FIG. 3.

In Step S11, the resolution conversion unit 45 performs resolution conversion on the captured image supplied from the camera signal processing unit 44.

For example, the resolution conversion unit 45 performs downsampling on the captured image as a high resolution image to generate a medium resolution image having a resolution lower than that of the high resolution image, that is, having a smaller size, and supplies the medium resolution image to the subject detection unit 81-2. Further, the resolution conversion unit 45 performs downsampling on the captured image as a high resolution image to generate a low resolution image having a resolution lower than that of the medium resolution image, and supplies the low resolution image to the subject detection unit 81-3.

In Step S12, the subject detection units 81-1 to 81-3 perform the subject detection processing on the supplied high resolution image, medium resolution image, and low resolution image and supply results of the detection to the overlap determination unit 91 and the degree-of-reliability determination unit 83.

For example, in the subject detection processing for the image of each resolution, a feature amount is extracted from each area of the image of each resolution, and a subject map indicating the likelihood of the subject in each area is generated. Further, a gradient map indicating the degree of change in the likelihood of the subject in the subject map is generated, so that a subject area is detected from a map obtained by performing threshold processing on the gradient map by using two different thresholds. The technique of detecting the subject using the subject map in such a manner is disclosed in Japanese Patent Application Laid-open No. 2010-266982, for example.

It should be noted that the method of detecting the subject from the images of respective resolutions is not limited to the method of using the subject map and any other method may be used. For example, the images of respective resolutions may be converted into images in a converted HSV (Hue Saturation Value) space serving as a color space in which saturation in a low value area is modulated, and a subject may be detected based on a color distance in the converted HSV space. Further, the subject detection may be performed by face detection, with a discriminator, and the like.

The subject detection unit 81-1 supplies the result of the subject detection on the high resolution image to the overlap determination unit 91 and the high resolution determination unit 95. For example, as the result of the subject detection, information indicating a rectangular area surrounding the area of the subject on the high resolution image, that is, information indicating the subject area, is output. Additionally, the subject detection unit 81-1 also supplies a value indicating the likelihood of the subject in each area, such as a feature amount extracted from each area of the high resolution image so as to detect the subject, to the high resolution determination unit 95. The value indicating the likelihood of the subject in each area of the high resolution image is used for the determination on the degree of reliability.

Similarly, the subject detection unit 81-2 supplies the result of the subject detection on the medium resolution image to the overlap determination unit 91 and the medium resolution determination unit 94 and also supplies a value indicating the likelihood of the subject in each area of the medium resolution image to the medium resolution determination unit 94. Further, the subject detection unit 81-3 supplies the result of the subject detection on the low resolution image to the overlap determination unit 91 and the low resolution determination unit 93 and also supplies a value indicating the likelihood of the subject in each area of the low resolution image to the low resolution determination unit 93.

In Step S13, the overlap determination unit 91 performs overlap determination processing based on the results of the subject detection supplied from the subject detection units 81.

Specifically, the overlap determination unit 91 calculates an overlap degree of two optional images among the three images with the different resolutions, that is, the high resolution image, the medium resolution image, and the low resolution image. In this case, the calculation of the overlap degree is performed for all of sets that can be a combination of two images with different resolutions.

Figure 4:
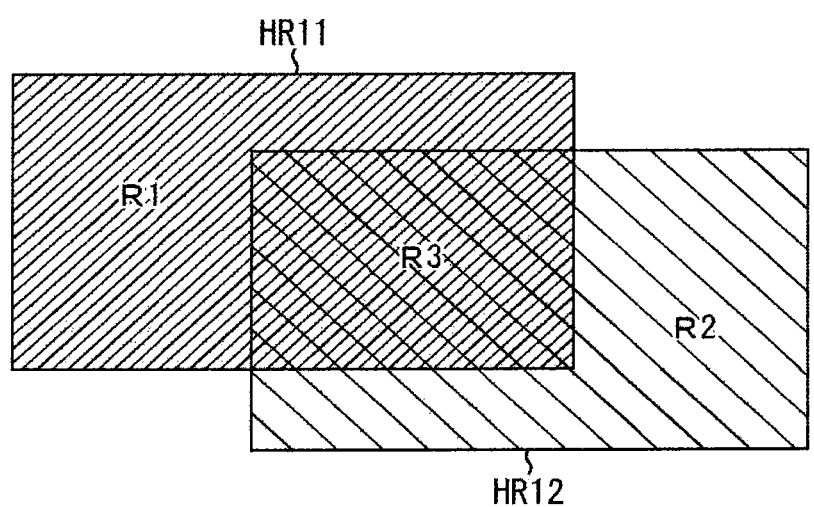
FIG. 4 is a diagram for describing a calculation of an overlap degree.

For example, it is assumed that when two images with different resolutions are arranged such that the same subjects overlap with each other, the subject areas partially overlap as shown in FIG. 4.

Here, a subject area HR11 represents an area of the subject, which is obtained as a result of the subject detection on one of the two target images with different resolutions. A subject area HR12 represents an area of the subject, which is obtained as a result of the subject detection on the other one of the two target images with different resolutions.

It should be noted that when the two images are caused to overlap, enlargement processing of making those images equal in size (resolution) is performed. For example, in order to change the images to have the same size as that of the high resolution image, upsampling is performed on the medium resolution image and the low resolution image.

In FIG. 4, a part of the subject area HR11 and a part of the subject area HR12 overlap. In this example, in the subject area HR11, an area that does not overlap with the subject area HR12 is represented as an area R1, and the area overlapping with the subject area HR12 is represented as an area R3. Further, in the subject area HR12, an area that does not overlap with the subject area HR11 is represented as an area R2.

The overlap determination unit 91 calculates an overlap degree F.-measure indicating how large the dimension of the area R3 serving as the overlapping area is with respect to the dimension of the subject area HR11 or subject area HR12, that is, how much the subject area HR11 and the subject area HR12 overlap.

More specifically, the overlap determination unit 91 calculates the following expression (1) based on the dimensions of the areas R1 to R3 to calculate the overlap degree F.-measure.

$$F\text{-measure}=2\times(R3/(R3+R1))\times(R3/(R3+R2))/(R3/(R3+R1)+R3/(R3+R2)) \quad (1)$$

It should be noted that in the expression (1), R1, R2, and R3 represent the dimension of the area R1, the dimension of the area R2, and the dimension of the area R3, respectively, in FIG. 4.

The overlap determination unit 91 calculates the overlap degree for all combinations of the resolutions. In this example, the overlap degree is calculated for a set of the high resolution image and the medium resolution image, a set of the high resolution image and the low resolution image, and a set of the medium resolution image and the low resolution image.

In the case where each of the obtained overlap degrees is equal to or larger than a predetermined threshold, the overlap determination unit 91 determines that the two images serving as calculation targets of the overlap degree, more specifically, the subject areas of those images overlap. The overlap determination unit 91 supplies overlap number information on the images of the respective resolutions to the majority decision unit 92 as a result of the overlap determination on the images of the respective resolutions. The overlap number information indicates the number of images with different resolutions that overlap with one image.

For example, now focusing on the high resolution image, in the case where the high resolution image and the medium resolution image overlap and the high resolution image and the low resolution image do not overlap, the overlap number information of the high resolution image is information indicating "1".

The overlap determination unit 91 supplies the overlap number information of the images of respective resolutions and the results of the subject detection, that is, the information indicating the subject area, to the majority decision unit 92.

In Step S14, the majority decision unit 92 determines whether there is an overlap of the subject areas of the images with different resolutions or not based on the overlap number information supplied from the overlap determination unit 91.

For example, in the case where the overlap number information of all images with different resolutions indicate "0", the majority decision unit 92 determines that the subject areas of the images with different resolutions do not overlap and there is no overlap therebetween.

When determining in Step S14 that there is an overlap, the majority decision unit 92 performs majority decision processing in Step S15 based on the overlap number information and the results of the subject detection supplied from the overlap determination unit 91.

Specifically, among the overlap number information of the images with respective resolutions, the majority decision unit 92 regards the subject area of an image with a resolution, which has the largest number as the overlap number information, to be a final subject area that is detected from the captured image (high resolution image).

Subsequently, the majority decision unit 92 supplies the information indicating the final subject area to the output unit 84. For example, the majority decision unit 92 outputs, as the information indicating the subject area, information on a position and size of the subject area. Specifically, the information indicating the subject area includes coordinates of one point in a rectangle representing the subject area on the image, information indicating the length of each side of the rectangle representing the subject area, and the like.

It can be said that the subject area detected from the image having the largest number of overlaps with the other images with different resolutions, among the images with different resolutions, has the highest likelihood in the subject areas detected from the images with different resolutions. In this regard, in the majority decision processing, the subject area of the image having the largest overlap number information is adopted as a final subject area. In other words, the subject area is determined by the majority decision based on the overlap number information.

In the case where there are a plurality of images having the largest overlap number information, the majority decision unit 92 adopts, out of the images having the largest overlap number information, the subject area of the image with the lowest resolution as a final subject area. For example, in the case where the overlap number information of the high resolution image and that of the medium resolution image are the largest in the images with different resolutions, the subject area of the medium resolution image is adopted as a final subject area.

This is because the execution of the resolution conversion can lead to more noise reduction as the image has a lower resolution and thus the detection accuracy for the subject area is more increased. It is known that in images with higher resolutions, the detection accuracy for a small subject is high but the detection of a large subject is not good, and in images with lower resolutions, the subject area can be detected stably with a certain high level of accuracy irrespective of the size of the subject area. Further, for the same reasons, also in the determination on the degree of reliability to be described later, the processing is sequentially performed from an image with a lower resolution.

After the majority decision processing is performed, the processing proceeds to Step S22.

Meanwhile, when determining in Step S14 that there is no overlap, since the subject area is not determined in the majority decision processing, the majority decision unit 92 instructs the low resolution determination unit 93 to execute processing of determining the subject area based on the degree of reliability on the subject detection, and the processing proceeds to Step S16. In the case where all of the overlap number information have the predetermined threshold or smaller, it may be configured that the majority decision processing is not allowed to determine the subject area.

In Step S16, the low resolution determination unit 93 determines whether the degree of reliability of the low resolution image is equal to or larger than the threshold.

Specifically, the low resolution determination unit 93 calculates the degree of reliability of the subject area detection on the low resolution image, based on the value indicating the likelihood of the subject in each area of the low resolution image supplied from the subject detection unit 81-3. For example, the degree of reliability is calculated in such a manner that, as a difference between a value indicating the likelihood of the subject in each area within the subject area detected from the low resolution image and a value indicating the likelihood of the subject in each area near the subject area but outside the subject area becomes larger, the degree of reliability becomes higher.

In the case where the degree of reliability thus obtained is equal to or larger than the threshold, it is considered that the result of the subject detection on the low resolution image is sufficiently reliable.

When determining in Step S16 that the degree of reliability of the low resolution image is equal to or larger than the threshold, in Step S17, the low resolution determination unit 93 supplies the result of the subject detection of the low resolution image to the output unit 84 as a final subject area. In other words, the information indicating the subject area is supplied to the output unit 84. After the subject area is output, the processing proceeds to Step S22.

Meanwhile, when determining in Step S16 that the degree of reliability is not equal to or larger than the threshold, since the result of the subject detection on the low resolution image is not sufficiently reliable, the low resolution determination unit 93 instructs the medium resolution determination unit 94 to execute the determination on the degree of reliability and the processing proceeds to Step S18.

In Step S18, the medium resolution determination unit 94 determines whether the degree of reliability of the medium resolution image is equal to or larger than the threshold.

Specifically, the medium resolution determination unit 94 calculates the degree of reliability by the same calculation as in the low resolution image, based on the value indicating the likelihood of the subject in each area of the medium resolution image supplied from the subject detection unit 81-2, and compares the obtained degree of reliability with a predetermined threshold.

When determining in Step S18 that the degree of reliability is equal to or larger than the threshold, in Step S19, the medium resolution determination unit 94 supplies the result of the subject detection of the medium resolution image to the output unit 84 as a final subject area. After the subject area is output, the processing proceeds to Step S22.

In contrast to this, when determining in Step S18 that the degree of reliability is not equal to or larger than the threshold, since the result of the subject detection on the medium resolution image is not sufficiently reliable, the medium resolution determination unit 94 instructs the high resolution determination unit 95 to execute the determination on the degree of reliability and the processing proceeds to Step S20.

In Step S20, the high resolution determination unit 95 determines whether the degree of reliability of the high resolution image is equal to or larger than the threshold.

Specifically, the high resolution determination unit 95 calculates the degree of reliability by the same calculation as in the low resolution image, based on the value indicating the likelihood of the subject in each area of the high resolution image supplied from the subject detection unit 81-1, and compares the obtained degree of reliability with a predetermined threshold.

When determining in Step S20 that the degree of reliability is equal to or larger than the threshold, in Step S21, the high resolution determination unit 95 supplies the result of the subject detection of the high resolution image to the output unit 84 as a final subject area. After the subject area is output, the processing proceeds to Step S22.

In contrast to this, when determining in Step S20 that the degree of reliability is not equal to or larger than the threshold, since the results of the subject detection on all of the images with different resolutions are not sufficiently reliable, the high resolution determination unit 95 supplies information to the output unit 84, the information indicating that the subject is not detected from the captured image at a sufficient degree of reliability. Subsequently, the processing proceeds to Step S22.

When the subject area is output in Step S15, Step S17, Step S19, or Step S21, or when the degree of reliability is determined not to be equal to or larger than the threshold in Step S20 and the information indicating that the subject is not detected at a sufficient degree of reliability is output, the processing of Step S22 is performed.

Specifically, in Step S22, the output unit 84 outputs the information indicating the subject area, which is supplied from the majority decision unit 92, the low resolution determination unit 93, the medium resolution determination unit 94, or the high resolution determination unit 95, as the subject information indicating the final subject area, and the subject information output processing is terminated. It should be noted that when the information indicating that the subject is not detected at a sufficient degree of reliability is supplied, the output unit 84 outputs information indicating that the subject is not detected.

The subject information output from the output unit 84 is used in each unit of the imaging apparatus 11.

For example, based on the subject information supplied from the output unit 84, the CPU 51 controls the driver 31 to perform focus control so as to focus on the subject on the captured image. Further, for example, based on the subject information output from the output unit 84, the camera signal processing unit 44 performs brightness adjustment and white balance adjustment on the captured image such that the brightness and white balance in the subject area of the captured image are made constant. Subsequently, the camera signal processing unit 44 outputs the captured image on which those adjustments are performed to the display controller 48 and the media controller 49. In addition thereto, the subject information may be used for anything, e.g., color adjustment in the subject area.

As described above, the imaging apparatus 11 performs the subject detection processing on the plurality of images with different resolutions to obtain the overlap degrees of the detection results and performs the majority decision based on the obtained overlap degrees to determine the final subject area. Additionally, in the case where the subject area is not determined by the majority decision, the imaging apparatus 11 determines the final subject area based on the degrees of reliability of the images with respective resolutions.

By the execution of the majority decision in such a manner, a detection result indicating a smaller number of overlaps with other images with different resolutions, that is, a false detection can be removed by the majority decision and thus the subject can be detected with a higher accuracy. Further, also when the subject area is not determined by the majority decision, the subject area is determined based on the degree of reliability of each resolution, so that the subject can be detected with a sufficient accuracy.

Consequently, the subject can be detected with a high accuracy also in a scene where the subject is difficult to detect, such as a scene where the foreground and the background are similar in color and a scene where some subjects overlap.

Further, since the subject can be detected with a high accuracy, this allows highly accurate autofocusing to be achieved also in a scene where a focus is hard to obtain and allows an automatic color correction to be achieved also in a scene where colors are difficult to adjust. So, a user can more easily take a good image.

Additionally, since the subject can be detected with a high accuracy, this allows the detection result to be used for a display user interface in a positive manner and an intelligent interface to be provided to the user.

Second Embodiment

Description on Subject Information Output Processing

In the above description, the example in which a probable result is selected from the results of the subject detection on the images with respective resolutions by the majority decision of the majority decision unit 92 has been described, but the subject area may be calculated based on some detection results. In other words, a detection result with a low degree of reliability may be removed by the majority decision and the remaining detection results may be used to calculate a final subject area.

Figure 5:
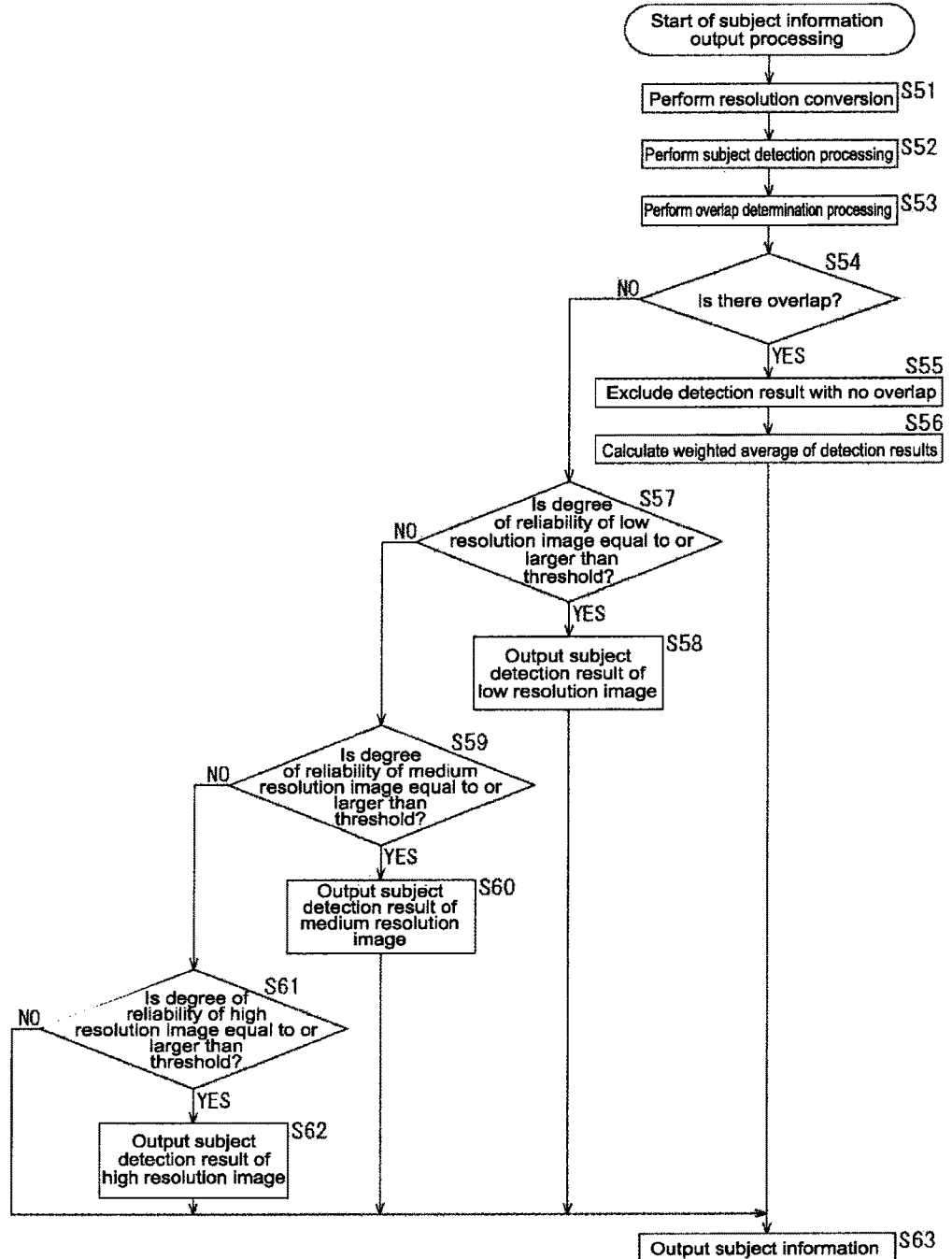
FIG. 5 is a flowchart for describing subject information output processing.

In such a case, the imaging apparatus 11 performs subject information output processing shown in FIG. 5, for example. Hereinafter, the subject information output processing by the imaging apparatus 11 will be described with reference to a flowchart of FIG. 5. The processing of Step S51 to Step S54 are the same as the processing of Step S11 to Step S14 of FIG. 3 and description thereof will be omitted.

When determining in Step S54 that there is an overlap, in Step S55, the majority decision unit 92 excludes a detection result with no overlap by the majority decision.

Specifically, the majority decision unit 92 excludes a detection result indicating that overlap number information is "0" from the results of the subject detection on the images with respective resolutions, based on the overlap number information supplied from the overlap determination unit 91. Here, a subject area detected from an image with a resolution whose overlap number information is "0" does not overlap with any subject areas detected from the other images with respective resolutions. So, there is a high possibility that the detection result of that subject area is a false detection.

Conversely, the subject detection result indicating that there is an overlap with a subject area detected from another image with a different resolution has less possibility of a false detection. So, the majority decision unit 92 excludes a subject detection result with a low degree of reliability by the majority decision based on the overlap number information and calculates a final subject area based on the subject detection results that are left without being excluded and indicate that there is an overlap with a subject area detected from another image with a different resolution.

In Step S56, the majority decision unit 92 calculates a weighted average of the detection results based on the subject detection results that are left without being excluded, to calculate a final subject area. In other words, one rectangular area newly obtained by a weighted average of the subject areas that are not excluded is regarded as a final subject area. In the calculation of the weighted average, a weighted average value of the positions of corresponding sides of the subject areas is calculated and the obtained position is regarded as a position of a corresponding side of a final subject area. Here, the weight on each subject area becomes larger in a subject area having a larger value (number) indicated by the overlap number information, for example.

When the final subject area is calculated in such a manner, the majority decision unit 92 supplies information indicating that final subject area to the output unit 84, and the processing proceeds to Step S63.

After the subject area is calculated by the weighted average in Step S56, processing of Step S57 to Step S63 are performed and the subject information output processing is terminated. Those processing of Step S57 to Step S63 are the same as the processing of Step S16 to Step S22 of FIG. 3 and description thereof will be omitted.

As described above, the imaging apparatus 11 performs the subject detection processing on the plurality of images with different resolutions to obtain the overlap degrees of the detection results and calculates a weighted average of the results of the subject detection based on the overlap degrees obtained by the majority decision to determine the final subject area. Additionally, in the case where the subject area is not determined by the majority decision, the imaging apparatus 11 determines the final subject area based on the degree of reliability of the images with respective resolutions.

Also by the calculation of the final subject area by the weighted average in such a manner, the subject can be detected with a higher accuracy by using only probable detection results. Further, also when the subject area is not determined by the majority decision, the subject area is determined based on the degree of reliability of each resolution, so that the subject can be detected with a sufficient accuracy.

It should be noted that the case of calculating the weighted average is described here as an example in which the final subject area is calculated using some results of the subject detection, but the final subject area may be calculated by any other method.

For example, based on the plurality of detection results that are left without being excluded, one rectangular area containing all the subject areas as the detection results may be regarded as a final subject area. Further, for example, only an area where all the subject areas remaining without being excluded overlap with one another, that is, only an area regarded as a subject area in the all images with respective resolutions may be regarded as a final subject area.

Further, only a subject area detected from an image with a resolution whose overlap number information is equal to or larger than a predetermined number may be used to calculate a final subject area. Further, a predetermined number of subject areas may be selected in descending order of the overlap number information to calculate a final subject area based on those subject areas.

Third Embodiment

Configuration Example of Camera Signal Processing Unit

In the above description, the example in which the same subject detection processing is performed on the images with different resolutions has been described as the subject detection processing performed a plurality of times on a target image of the subject detection. However, a plurality types of subject detection processing that are different from one another may be performed on an image with a single resolution as the subject detection processing performed a plurality of times.

Figure 6:
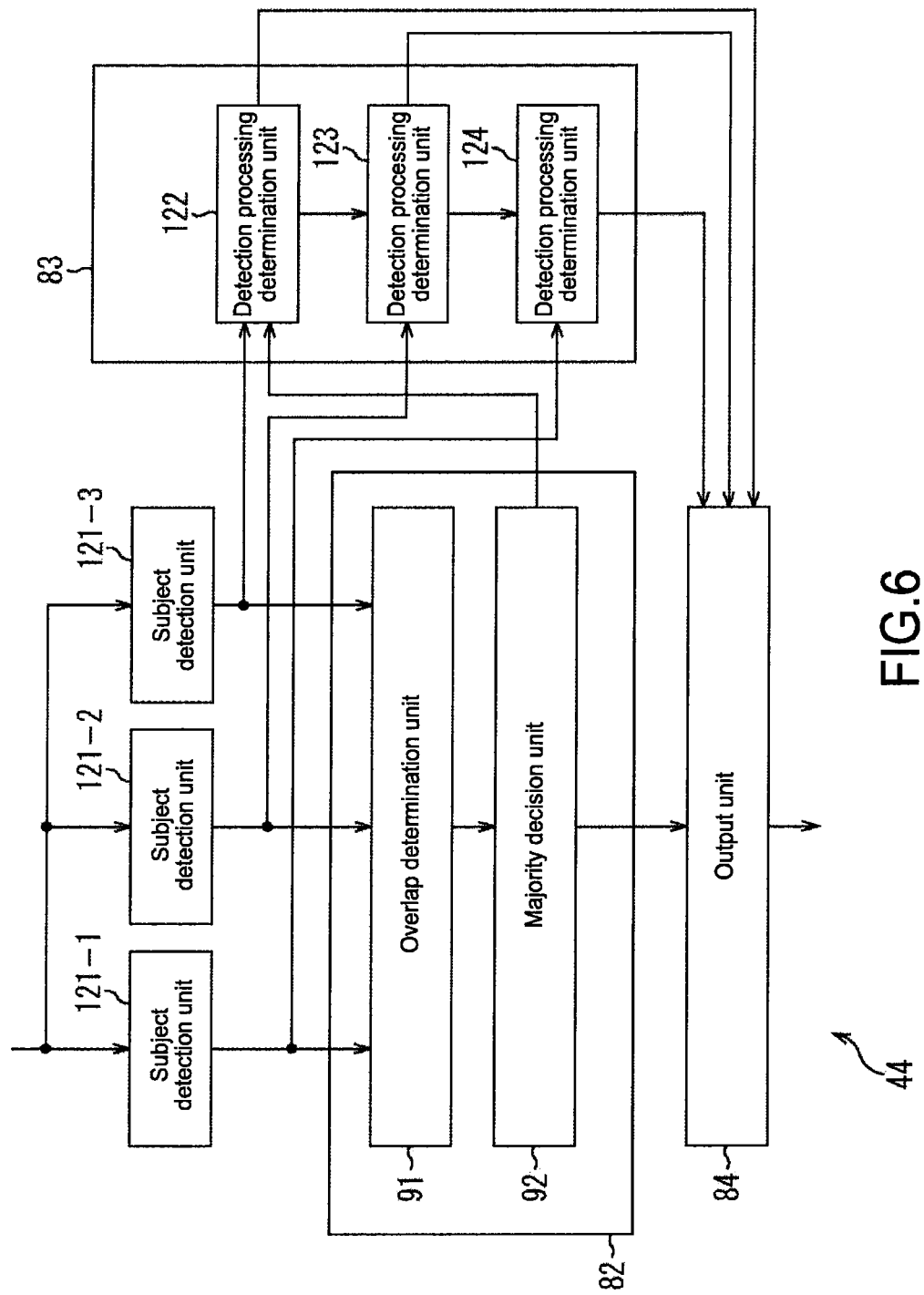
FIG. 6 is a diagram showing a configuration example of a camera signal processing unit.

In such a case, the camera signal processing unit 44 is configured as shown in FIG. 6, for example. It should be noted that in FIG. 6, portions corresponding to those of FIG. 2 are denoted by the same reference numerals and description thereof will be omitted as appropriate.

The camera signal processing unit 44 shown in FIG. 6 includes subject detection units 121-1, 121-2, and 121-3, a subject area determination unit 82, a degree-of-reliability determination unit 83, and an output unit 84.

A captured image with a single resolution, that is, a single high resolution image is supplied to the subject detection units 121-1 to 121-3.

The subject detection units 121-1 to 121-3 perform subject detection processing on the supplied captured image to detect a subject area from the captured image and supplies results of the detection to the subject area determination unit 82 and the degree-of-reliability determination unit 83.

It should be noted that when the subject detection units 121-1 to 121-3 have not to be distinguished particularly in the following description, each of the subject detection units 121-1 to 121-3 is simply referred to as a subject detection unit 121.

Here, in each subject detection unit 121, the subject detection is performed on the same captured image by different algorithms. In other words, in each subject detection unit 121, the captured image to be processed is the same, but different types of subject detection processing are performed on the image. Those different types of subject detection processing are expected to provide the same result as a result of the subject detection.

In the following description, in order to distinguish the subject detection processing performed by the respective subject detection units 121, the subject detection processing by the subject detection unit 121-1, the subject detection processing by the subject detection unit 121-2, and the subject detection processing by the subject detection unit 121-3 are also referred to as subject detection processing D1, subject detection processing D2, and subject detection processing D3, respectively.

Further, the degree-of-reliability determination unit 83 shown in FIG. 6 includes a detection processing determination unit 122, a detection processing determination unit 123, and a detection processing determination unit 124.

According to an instruction of the majority decision unit 92, based on a result of the subject detection by the subject detection processing D3 that is supplied from the subject detection unit 121-3, the detection processing determination unit 122 determines the degree of reliability on the result of the detection. In the case where the result of the subject detection by the subject detection processing D3 is sufficiently reliable as a result of the determination on the degree of reliability, the detection processing determination unit 122 supplies the result of the subject detection by the subject detection processing D3 to the output unit 84 as a final subject area. Further, in the case where the result of the subject detection by the subject detection processing D3 is not sufficiently reliable as a result of the determination on the degree of reliability, the detection processing determination unit 122 instructs the detection processing determination unit 123 to execute the determination on the degree of reliability.

According to an instruction of the detection processing determination unit 122, based on a result of the subject detection by the subject detection processing D2 that is supplied from the subject detection unit 121-2, the detection processing determination unit 123 determines the degree of reliability on the result of the detection. In the case where the result of the subject detection by the subject detection processing D2 is sufficiently reliable as a result of the determination on the degree of reliability, the detection processing determination unit 123 supplies the result of the subject detection by the subject detection processing D2 to the output unit 84 as a final subject area. Further, in the case where the result of the subject detection by the subject detection processing D2 is not sufficiently reliable as a result of the determination on the degree of reliability, the detection processing determination unit 123 instructs the detection processing determination unit 124 to execute the determination on the degree of reliability.

According to an instruction of the detection processing determination unit 123, based on a result of the subject detection by the subject detection processing D1 that is supplied from the subject detection unit 121-1, the detection processing determination unit 124 determines the degree of reliability on the result of the detection. In the case where the result of the subject detection by the subject detection processing D1 is sufficiently reliable as a result of the determination on the degree of reliability, the detection processing determination unit 124 supplies the result of the subject detection by the subject detection processing D1 to the output unit 84 as a final subject area. Further, in the case where the result of the subject detection by the subject detection processing D1 is not sufficiently reliable as a result of the determination on the degree of reliability, the detection processing determination unit 124 supplies information, which indicates that a subject is not detected from the captured image at a sufficient degree of reliability, to the output unit 84.

(Description on Subject Information Output Processing)

Figure 7:
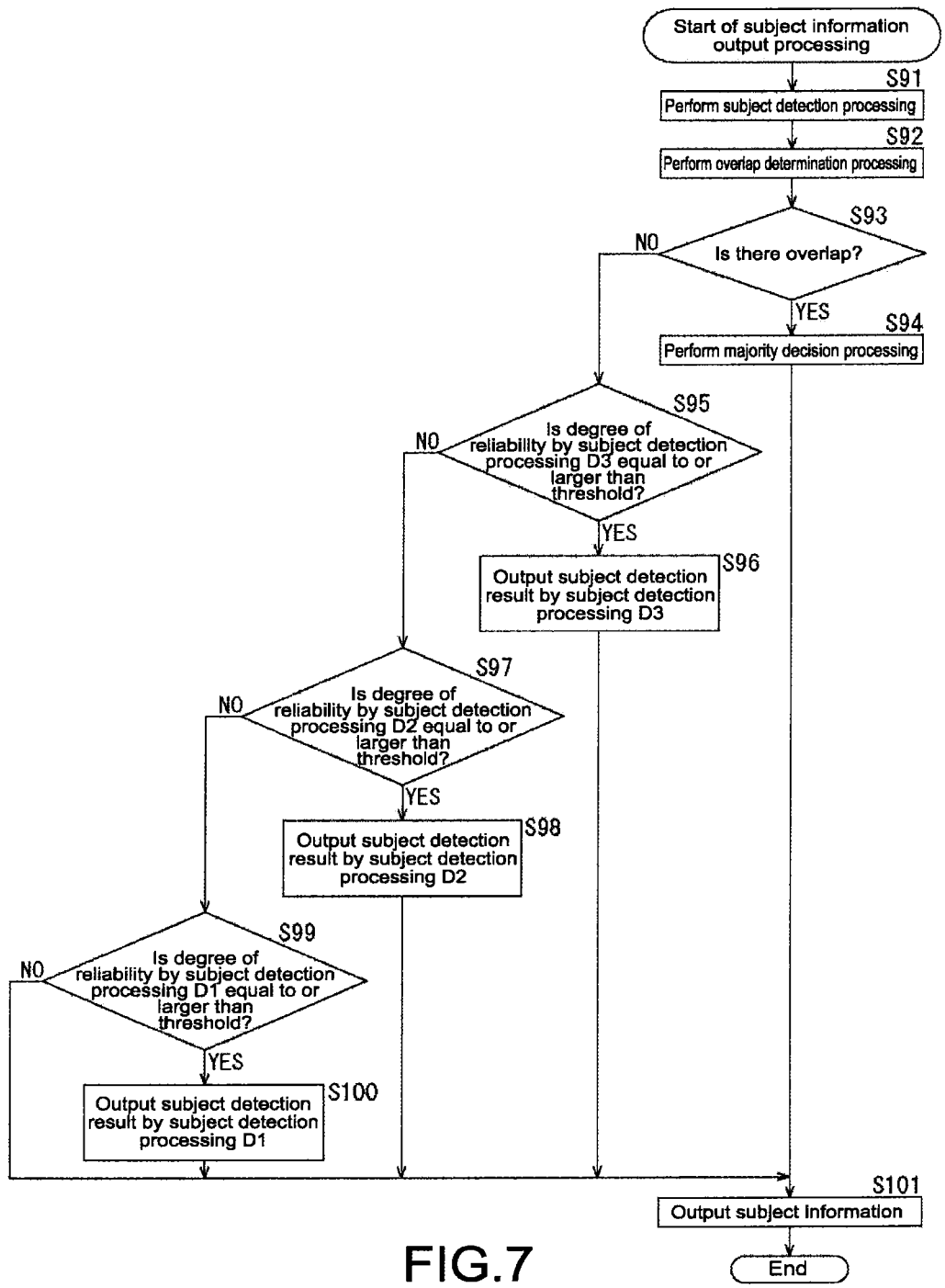
FIG. 7 is a flowchart for describing subject information output processing.

Subsequently, the operation of the imaging apparatus 11 in the case where the camera signal processing unit 44 has the configuration shown in FIG. 6 will be described. In this case, the imaging apparatus 11 performs subject information output processing shown in FIG. 7. Hereinafter, the subject information output processing by the imaging apparatus 11 will be described with reference to a flowchart of FIG. 7.

In Step S91, the subject detection units 121-1 to 121-3 perform the subject detection processing on the supplied captured image, i.e., a high resolution image and supplies results of the detection to the overlap determination unit 91 and the degree-of-reliability determination unit 83.

Specifically, the subject detection unit 121-1 performs the subject detection processing D1 to detect a subject from the captured image, the subject detection unit 121-2 performs the subject detection processing D2 to detect a subject from the captured image, and the subject detection unit 121-3 performs the subject detection processing D3 to detect a subject from the captured image.

For example, the subject detection processing D1 is processing in which a subject map is used to detect a subject, the subject detection processing D2 is processing in which a subject is detected based on a color distance in a converted HSV space, and the subject detection processing D3 is processing using a discriminator. It should be noted that the subject detection processing D1 to D3 may be any type of processing as long as those processing are appropriately determined in advance.

Further, the subject detection units 121-1 to 121-3 each supply a value indicating the likelihood of the subject in each area, such as a feature amount extracted from each area of the captured image so as to detect the subject, to the detection processing determination units 122 to 124.

After the subject is detected in Step S91, processing of Step S92 to Step S94 are performed. Those processing are the same as the processing of Step S13 to Step S15 of FIG. 3 and description thereof will be omitted.

However, in the majority decision of Step S94, in the case where there are a plurality of images having the largest overlap number information, the majority decision unit 92 adopts, out of the images having the largest overlap number information, a subject area of the image on which the subject detection processing determined in predetermined order are performed, as a final subject area. Here, the predetermined order refers to the order of the subject detection processing D3, the subject detection processing D2, and the subject detection processing D1. Thus, in the order of the subject detection processing D3 to the subject detection processing D1, the result of the subject detection is selected as a final subject area. The order of the subject detection processing only needs to be determined in advance in accordance with the detection accuracy for the subject or use application.

After the processing of Step S94 is performed, the processing proceeds to Step S101.

Meanwhile, when determining in Step S93 that there is no overlap, the majority decision unit 92 instructs the detection processing determination unit 122 to execute processing of determining the subject area based on the degree of reliability on the subject detection, and the processing proceeds to Step S95.

In Step S95, the detection processing determination unit 122 determines whether the degree of reliability of the subject detection by the subject detection processing D3 is equal to or larger than a threshold.

Specifically, the detection processing determination unit 122 calculates the degree of reliability of the subject area detection by the subject detection processing D3 based on a value indicating the likelihood of the subject in each area of the captured image supplied from the subject detection unit 121-3. For example, the degree of reliability is calculated by the same calculation as in Step S16 of FIG. 3.

When determining in Step S95 that the degree of reliability is equal to or larger than the threshold, in Step S96, the detection processing determination unit 122 supplies the result of the subject detection by the subject detection processing D3 to the output unit 84 as a final subject area. In other words, the information indicating the subject area is supplied to the output unit 84. After the subject area is output, the processing proceeds to Step S101.

Meanwhile, when determining in Step S95 that the degree of reliability is not equal to or larger than the threshold, the detection processing determination unit 122 instructs the detection processing determination unit 123 to execute the determination on the degree of reliability and the processing proceeds to Step S97.

In Step S97, the detection processing determination unit 123 determines whether the degree of reliability of the subject detection by the subject detection processing D2 is equal to or larger than the threshold.

Specifically, the detection processing determination unit 123 calculates the degree of reliability by the same calculation as in the calculation of the degree of reliability by the subject detection processing D3, based on a value indicating the likelihood of the subject in each area supplied from the subject detection unit 121-2, and compares the obtained degree of reliability with a predetermined threshold.

When determining in Step S97 that the degree of reliability is equal to or larger than the threshold, in Step S98, the detection processing determination unit 123 supplies the result of the subject detection by the subject detection processing D2 to the output unit 84 as a final subject area. After the subject area is output, the processing proceeds to Step S101.

In contrast to this, when determining in Step S97 that the degree of reliability is not equal to or larger than the threshold, since the result of the subject detection by the subject detection processing D2 is not sufficiently reliable, the detection processing determination unit 123 instructs the detection processing determination unit 124 to execute the determination on the degree of reliability and the processing proceeds to Step S99.

In Step S99, the detection processing determination unit 124 determines whether the degree of reliability of the subject detection by the subject detection processing D1 is equal to or larger than the threshold.

Specifically, the detection processing determination unit 124 calculates the degree of reliability by the same calculation as in the calculation of the degree of reliability by the subject detection processing D3, based on a value indicating the likelihood of the subject in each area supplied from the subject detection unit 121-1, and compares the obtained degree of reliability with a predetermined threshold.

When determining in Step S99 that the degree of reliability is equal to or larger than the threshold, in Step S100, the detection processing determination unit 124 supplies the result of the subject detection by the subject detection processing D1 to the output unit 84 as a final subject area. After the subject area is output, the processing proceeds to Step S101.

In contrast to this, when determining in Step S99 that the degree of reliability is not equal to or larger than the threshold, since the results of the subject detection by all of the subject detection processing are not sufficiently reliable, the detection processing determination unit 124 supplies information to the output unit 84, the information indicating that the subject is not detected from the captured image at a sufficient degree of reliability. Subsequently, the processing proceeds to Step S101.

When the subject area is output in Step S94, Step S96, Step S98, or Step S100, or when the degree of reliability is determined not to be equal to or larger than the threshold in Step S99 and the information indicating that the subject is not detected at a sufficient degree of reliability is output, the processing of Step S101 is performed.

Specifically, in Step S101, the output unit 84 outputs the information indicating the subject area, which is supplied form the majority decision unit 92, the detection processing determination unit 122, the detection processing determination unit 123, or the detection processing determination unit 124, as subject information indicating the final subject area, and the subject information output processing is terminated. It should be noted that when the information indicating that the subject is not detected at a sufficient degree of reliability is supplied, the output unit 84 outputs information indicating that the subject is not detected.

As described above, the imaging apparatus 11 performs the plurality of types of subject detection processing on the captured image to obtain the overlap degrees of the detection results and performs the majority decision based on the obtained overlap degrees to determine the final subject area. Additionally, in the case where the subject area is not determined by the majority decision, the imaging apparatus 11 determines the final subject area based on the degrees of reliability of the respective types of subject detection processing.

By the execution of the majority decision in such a manner, a detection result indicating a smaller number of overlaps with other images with respective resolutions, that is, a false detection can be removed by the majority decision and thus the subject can be detected with a higher accuracy. Further, also when the subject area is not determined by the majority decision, the subject area is determined based on the degree of reliability of each type of subject detection processing, so that the subject can be detected with a sufficient accuracy.

Also in the case where the camera signal processing unit 44 has the configuration as shown in FIG. 6, the final subject area may be determined by the majority decision described in the second embodiment.

Incidentally, the series of processing described above may be executed by hardware or software. In the case where the series of processing is executed by software, programs constituting the software are installed in a computer. Here, the computer includes a computer incorporated in dedicated hardware and a general-purpose computer that can execute various functions by installing various programs therein, for example.

Figure 8:
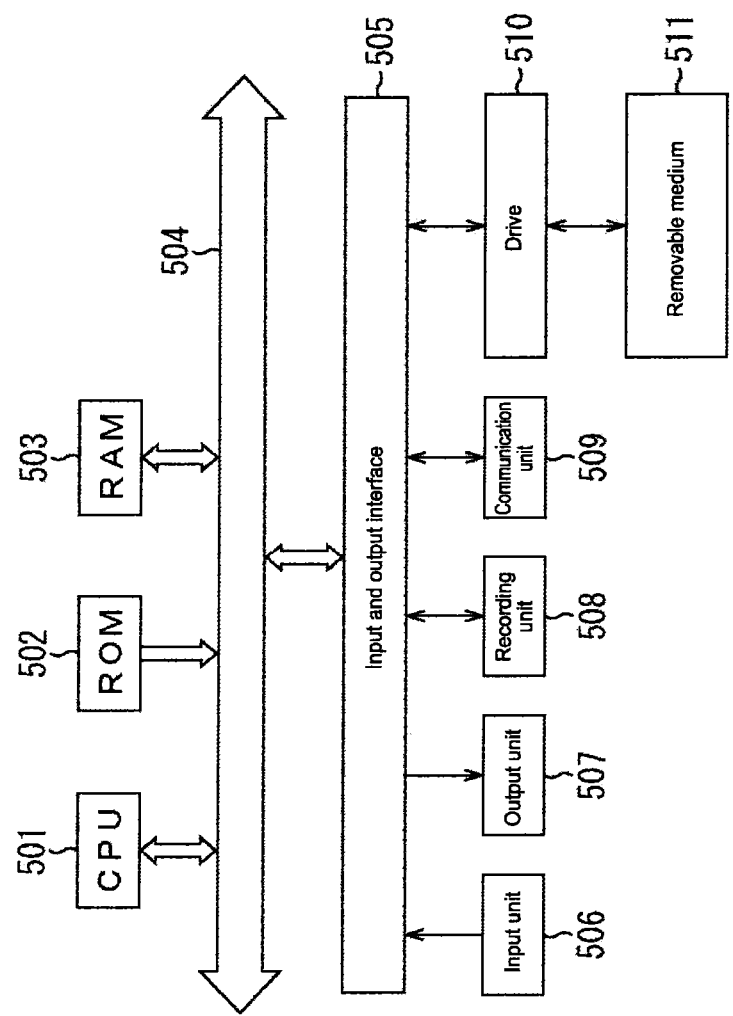
FIG. 8 is a diagram showing a configuration example of a computer.

FIG. 8 is a block diagram showing a hardware configuration example of a computer that executes the series of processing described above by programs.

In the computer, a CPU 501, a ROM 502, and a RAM 503 are connected to one another by a bus 504.

The bus 504 is also connected to an input and output interface 505. The input and output interface 505 is connected to an input unit 506, an output unit 507, a recording unit 508, a communication unit 509, and a drive 510.

The input unit 506 includes a keyboard, a mouse, microphones, an imaging device, and the like. The output unit 507 includes a display, a speaker, and the like. The recording unit 508 includes a hard disk, a non-volatile memory, and the like. The communication unit 509 includes a network interface and the like. The drive 510 drives a removable medium 511 such as a magnetic disc, an optical disc, a magneto-optical disc, or a semiconductor memory.

In the computer configured as described above, the CPU 501 loads a program, which is stored in the recording unit 508 for example, to the RAM 503 via the input and output interface 505 and the bus 504 for execution, so that the series of processing described above is performed.

For example, the program executed by the computer (CPU 501) can be provided by being recorded on the removable medium 511 as a package medium. Additionally, the program can be provided via wired or wireless transmission media such as a local area network, the Internet, and digital satellite broadcasting.

In the computer, the program can be installed in the recording unit 508 via the input and output interface 505 by mounting the removable medium 511 to the drive 510. Further, the program can be received by the communication unit 509 via the wired or wireless transmission media and installed in the recording unit 508. In addition thereto, the program can be installed in advance in the ROM 502 or the recording unit 508.

It should be noted that the program executed by the computer may be a program in which processing are performed in time series along the order described in this specification or may be a program in which processing is performed at necessary timings such as when processing is performed in parallel or an invocation is performed.

Further, the embodiments of the present disclosure are not limited to the embodiments described above and may be variously modified without departing from the gist of the present disclosure.

For example, the present disclosure can have a configuration of cloud computing in which a plurality of apparatuses share one function and cooperate to perform processing via a network.

Furthermore, the steps described in the flowcharts described above can be executed by one apparatus or shared and executed by a plurality of apparatuses.

Additionally, in the case where one step includes a plurality of processing steps, the plurality of processing steps in the one step can be executed by one apparatus or shared and executed by a plurality of apparatuses.

Additionally, the effects described in this specification are merely examples and are not limited ones, and other effects may be produced.

Moreover, the present disclosure can have the following configurations.

(1) An image processing apparatus, including:
a subject detection unit configured to perform subject detection processing to detect a subject area from an input image; and
a subject area determination unit configured to determine a final subject area by majority decision processing that is based on the subject areas detected in the subject detection processing performed a plurality of times.

(2) The image processing apparatus according to (1), in which
the subject area determination unit includes
an overlap determination unit configured to calculate an overlap degree between two of the subject areas, for each of the subject areas detected in the subject detection processing performed the plurality of times, and
a majority decision unit configured to determine the final subject area by the majority decision processing based on the overlap degrees.

(3) The image processing apparatus according to (2), in which
the overlap determination unit is configured to determine whether the subject areas overlap or not based on the overlap degrees, and
the majority decision unit is configured to perform the majority decision processing based on the number of overlaps between the subject area obtained by one of the subject detection processing and the subject area obtained by another one of the subject detection processing, the number of overlaps being obtained by a determination of the overlap determination unit.

(4) The image processing apparatus according to (3), in which
the majority decision unit is configured to determine the subject area having the largest number of overlaps as the final subject area.
(5) The image processing apparatus according to (3), in which
the majority decision unit is configured to exclude the subject area having a low degree of reliability based on the number of overlaps and calculate the final subject area based on the subject area that is left without being excluded.
(6) The image processing apparatus according to any one of (1) to (5), in which
the subject detection processing performed the plurality of times includes the same subject detection processing that is performed on input images with different resolutions.
(7) The image processing apparatus according to any one of (1) to (5), in which
the subject detection processing performed the plurality of times includes different types of subject detection processing that are performed on the same input image.
(8) The image processing apparatus according to any one of (1) to (7), further including
a degree-of-reliability determination unit configured to determine, in a case where the final subject area is not obtained by the majority decision processing, the final subject area from the subject areas based on degrees of reliability of the subject areas detected in the subject detection processing performed the plurality of times.
(9) An image processing method, including:
performing subject detection processing to detect a subject area from an input image; and
determining a final subject area by majority decision processing that is based on the subject areas detected in the subject detection processing performed a plurality of times.
(10) A program causing a computer to execute processing including:
performing subject detection processing to detect a subject area from an input image; and
determining a final subject area by majority decision processing that is based on the subject areas detected in the subject detection processing performed a plurality of times.
(11) An image processing apparatus, including:
a subject area detector that performs subject area detection processing a plurality of times on an input image to detect respective subject areas on a plurality of processes performed on the input image, and
a subject area determinator that determines a final subject area for the input image by majority decision processing of the respective subject areas.
(12) The image processing apparatus according to (11), wherein
the circuitry is also configured to implement
an overlap determinator that calculates an overlap degree for each pair of the respective subject areas, and
a majority decision processor configured to determine the final subject area by the majority decision processing based on the overlap degree for each pair of the respective subject areas.
(13) The image processing apparatus according to (12), wherein
the overlap determinator is configured to
determine whether the respective subject areas overlap or not for a particular pair of the respective subject areas based on the overlap degree for the particular pair, and
for each process performed on the input image, keep track of a number of overlaps identified for the subject area of each process performed on the input image, and
the majority decision processor is configured to perform the majority decision processing based on the number of overlaps.
(14) The image processing apparatus according to (13), wherein
the majority decision processor is configured to determine as the final subject area the subject area for the process of the plurality of processes performed on the input image that has a largest number of overlaps.
(15) The image processing apparatus according to (13), wherein
the majority decision processor is configured to
exclude a particular subject area having a low degree of reliability based on the number of overlaps for the particular subject area, and
calculate the final subject area based on subject areas that have not been excluded.
(16) The image processing apparatus according to (11), wherein
respective of the plurality of processes performed on the input image process the input image with different resolutions.
(17) The image processing apparatus according to (11), wherein
the plurality of processes performed on the input image are different types of subject detection processing performed on the input image.
(18) The image processing apparatus according to (11), wherein the circuitry is further configured to implement
a degree-of-reliability determinator that determines, in a case where the majority decision processing fails to reliably identify the final subject area, the final subject area based on degrees of reliability of the respective subject areas.
(19) An image processing method, including:
performing subject area detection processing with circuitry a plurality of times on an input image to detect respective subject areas with a plurality of processes performed on the input image; and
determining a final subject area for the input image by majority decision processing of the respective subject areas.
(20) The image processing method according to (19), further including
calculating an overlap degree for each pair of the respective subject areas, wherein
the determining includes determining the final subject area by the majority decision processing based on the overlap degree for each pair of the respective subject areas.
(21) The image processing method according to (20), wherein
the determining includes determining whether the respective subject areas overlap or not for a particular pair of the respective subject areas based on the overlap degree for the particular pair,
for each process performed on the input image, keeping track of a number of overlaps identified for the subject area of each process performed on the input image, and
performing the majority decision processing based on the number of overlaps.
(22) The image processing method according to (21), wherein
the determining includes determining as the final subject area the subject area for the process performed on the input image that has a largest number of overlaps.

(23) The image processing method according to (21), further comprising:
excluding a particular subject area having a low degree of reliability based on the number of overlaps for the particular subject area, and
calculating the final subject area based on subject areas that have not been excluded.

(24) The image processing method according to (19), wherein
respective of the plurality of processes performed on the input image have different resolutions.

(25) The image processing method according to (19), wherein
the plurality of processes performed on the input image are each a result of a different type of subject detection processing performed on the input image.

(26) The image processing method according to (19), further including:
determining in a case where the majority decision processing fails to reliably identify the final subject area, the final subject area based on degrees of reliability of the respective subject areas.

(27) A non-transitory storage medium that has a program stored therein that when executed by processing circuitry causes the processing circuitry to perform a method, the method including:
performing subject area detection processing a plurality of times on an input image to detect respective subject areas on a plurality of processes performed on the input image; and
determining a final subject area for the input image by majority decision processing of the respective subject areas.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a processor configured to
perform subject area detection processing a plurality of times on an input image to detect respective subject areas on a plurality of processes performed on the input image with different resolutions including a lower resolution and a higher resolution;
determine whether an overlap exists between each pair of the respective subject areas with the different resolutions respectively by determining an overlap respectively between a first subject area of a certain object in the input image with the lower resolution and a second subject area of the certain object in the input image with the higher resolution after making each pair of the respective subject areas with the different resolutions equal in size;
determine a final subject area for the input image based on a number of the pair for which the overlap is determined to exist; and
perform a control related with imaging based on the determined final subject area of the input image.

2. The image processing apparatus according to claim 1, wherein
the processor is further configured to
calculate an overlap degree for each pair of the respective subject areas; and
determine the final subject area by majority decision processing based on the overlap degree for each pair of the respective subject areas.

3. The image processing apparatus according to claim 2, wherein
the processor is further configured to
determine whether the respective subject areas overlap or not for a particular pair of the respective subject areas based on the overlap degree for the particular pair;
for each process performed on the input image, keep track of the number of the pair; and
perform the majority decision processing based on the number of the pair.

4. The image processing apparatus according to claim 1, wherein
the processor is configured to determine the final subject area for the input image based on the number of the pair for which the overlap is determined to exist such that a subject area in the input image with a resolution having a largest number is determined as the final subject area.

5. The image processing apparatus according to claim 3, wherein
the processor is further configured to
exclude a particular subject area having a low degree of reliability based on the number of the pair; and
calculate the final subject area based on subject areas that have not been excluded.

6. The image processing apparatus according to claim 1, wherein
the plurality of processes performed on the input image are different types of subject detection processing performed on the input image.

7. The image processing apparatus according to claim 1, wherein the processor is further configured to
determine a final subject area for the input image by majority decision processing of the respective subject areas; and
determine, in a case where the majority decision processing fails to reliably identify the final subject area; the final subject area based on degrees of reliability of the respective subject areas.

8. The image processing apparatus according to claim 1, wherein the processor is further configured to:
determine whether a first reliability degree of the input image with the lower resolution is equal to or higher than a first threshold in a case that the processor determines the overlap does not exist between each pair of the respective subject areas with the different resolutions;
determine a subject area of the input image with the lower resolution as the final subject area for the input image in a case that the processor determines the first reliability degree of the input image with the lower resolution is equal to or higher than the first threshold;
determine whether a second reliability degree of the input image of the higher resolution is equal to or higher than a second threshold in a case that the processor determines the first reliability degree of the input image with the lower resolution is not equal to or higher than the first threshold; and
determine a subject area of the input image with the higher resolution as the final subject area for the input image in a case that the processor determines the second reliability degree of the input image with the higher resolution is equal to or higher than the second threshold.

9. The image processing apparatus according to claim 1, wherein the control related with the imaging includes at least one of autofocusing, an automatic color correction, white balance adjustment, brightness adjustment, or contrast adjustment.

10. An image processing apparatus, comprising:
a processor configured to
perform subject area detection processing a plurality of times on an input image to detect respective subject areas on a plurality of processes performed on the input image with different resolutions including a lower resolution and a higher resolution;
determine whether an overlap exists between each pair of the respective subject areas with the different resolutions respectively by determining an overlap respectively between a first subject area of a certain object in the input image with the lower resolution and a second subject area of the certain object in the input image with the higher resolution after making each pair of the respective subject areas with the different resolutions equal in size; and
determine a final subject area for the input image based on a number of the pair for which the overlap is determined to exist, wherein
the final subject area is a face area.

11. The image processing apparatus according to claim 10, wherein
the processor is further configured to
calculate an overlap degree for each pair of the respective subject areas; and
determine the final subject area by majority decision processing based on the overlap degree for each pair of the respective subject areas.

12. The image processing apparatus according to claim 11, wherein
the processor is further configured to
determine whether the respective subject areas overlap or not for a particular pair of the respective subject areas based on the overlap degree for the particular pair;
for each process performed on the input image, keep track of the number of the pair; and
perform the majority decision processing based on the number of the pair.

13. The image processing apparatus according to claim 10, wherein
the processor is configured to determine the final subject area for the input image based on the number of the pair for which the overlap is determined to exist such that a subject area in the input image with a resolution having a largest number is determined as the final subject area.

14. The image processing apparatus according to claim 10, wherein
the processor is configured to perform a control related with imaging based on the determined final subject area of the input image.

15. A non-transitory computer readable medium including executable instructions, which when executed by a computer cause the computer to:
perform subject area detection processing a plurality of times on an input image to detect respective subject areas on a plurality of processes performed on the input image with different resolutions including a lower resolution and a higher resolution;
determine whether an overlap exists between each pair of the respective subject areas with the different resolutions respectively by determining an overlap respectively between a first subject area of a certain object in the input image with the lower resolution and a second subject area of the certain object in the input image with the higher resolution after making each pair of the respective subject areas with the different resolutions equal in size;
determine a final subject area for the input image based on a number of the pair for which the overlap is determined to exist; and
perform at least one of an automatic color correction, a white balance adjustment, a brightness adjustment, and a contrast adjustment based on the determined final subject area of the input image.

16. The non-transitory computer readable medium according to claim 15, wherein the executable instructions, when executed by computer, cause the computer to:
calculate an overlap degree for each pair of the respective subject areas; and
determine the final subject area by majority decision processing based on the overlap degree for each pair of the respective subject areas.

17. The non-transitory computer readable medium according to claim 16, wherein the executable instructions, when executed by the computer, cause the computer to:
determine whether the respective subject areas overlap or not for a particular pair of the respective subject areas based on the overlap degree for the particular pair;
for each process performed on the input image, keep track of the number of the pair; and
perform the majority decision processing based on the number of the pair.

18. The non-transitory computer readable medium according to claim 17, wherein the executable instructions, when executed by the computer, cause the computer to:
exclude a particular subject area having a low degree of reliability based on the number of the pair; and
calculate the final subject area based on subject areas that have not been excluded.

19. The non-transitory computer readable medium according to claim 15, wherein the executable instructions, when executed by the computer, cause the computer to determine the final subject area for the input image based on the number of the pair for which the overlap is determined to exist such that a subject area in the input image with a resolution having a largest number is determined as the final subject area.

20. An image processing apparatus, comprising
a processor configured to
perform subject area detection processing a plurality of times on an input image to detect respective subject areas on a plurality of processes performed on the input image with different resolutions including a lower resolution and a higher resolution;
determine whether an overlap exists between each pair of the respective subject areas with the different resolutions respectively by determining an overlap respectively between a first subject area of a certain object in the input image with the lower resolution and a second subject area of the certain object in the input image with the higher resolution after making each pair of the respective subject areas with the different resolutions equal in size; and
determine a final subject area for the input image based on a number of the pair for which the overlap is determined to exist, wherein
the different resolutions include more than two different resolutions.

21. The image processing apparatus according to claim 20, wherein the processor is further configured to
- calculate an overlap degree for each pair of the respective subject areas; and
- determine the final subject area by majority decision processing based on the overlap degree for each pair of the respective subject areas.

22. The image processing apparatus according to claim 21, wherein
the processor is further configured to
- determine whether the respective subject areas overlap or not for a particular pair of the respective subject areas based on the overlap degree for the particular pair;
- for each process performed on the input image, keep track of the number of the pair; and
- perform the majority decision processing based on the number of the pair.

23. The image processing apparatus according to claim 20, wherein
the processor is configured to determine the final subject area for the input image based on the number of the pair for which the overlap is determined to exist such that a subject area in the input image with a resolution laving a largest number is determined as the final subject area.

24. The image processing apparatus according to claim 20, wherein
the processor is configured to perform a control related with imaging based on the determined final subject area of the input image.

* * * * *